Patented Oct. 5, 1954

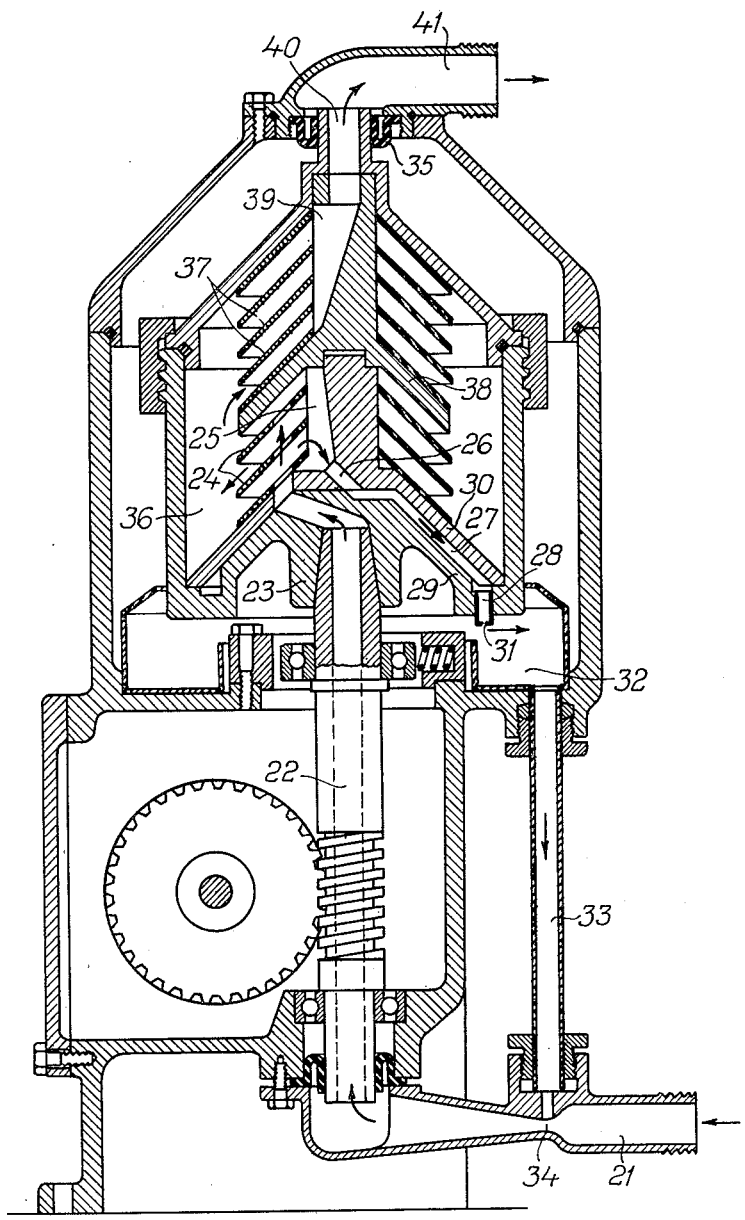

2,690,900

UNITED STATES PATENT OFFICE 2,690,900

METHOD AND ARRANGEMENT FOR HOMOGENIZATION OF LIQUIDS

Stig Holger Bjarne Zachariassén, Stockholm, Sweden, assignor to Aktiebolaget Separator, Stockholm, Sweden, a corporation of Sweden Application June 21, 1949, Serial No. 100,442

14 Claims. (Cl. 259—96)

This invention relates to a method and apparatus for homogenizing milk and other dispersions.

Milk for human consumption is treated in various way, according to the product for which it is intended. Sometimes, it is subjected only to a purification, and sometimes it is separated into cream and skim milk in order to obtain a product rich in fat. This is accomplished with a simple decantation, that is, through separation by the force of gravity. In order to intensify the separating process, centrifugal separators are generally used, in which the active centrifugal field is many times greater than the force of gravity. In some instances it is desirable to keep the composition of the milk at a certain predetermined fat content, so that the milk, even if it is left to stand for a long time, is not divided up into its various components by gravity settling. This objective can be attained by homogenization, that is, a fine comminution of the fat in the milk serum. It is also desirable to effect similar treatment of other products, which occur in an emulsified state, or which are worked up or used as an emulsion. The machines generally used for these treatments are designed for either separating only or homogenizing only. In a separator, for instance, two liquids, fat and water, are separated from each other. In a homogenizing machine, on the contrary, they are mixed intimately with each other.

According to the invention, a separator is combined with a homogenizing arrangement in such a way that the force field, which is prevailing in the rotating separator bowl and is used for the separation, at the same time is used as a source of pressure for a homogenizing apparatus. In this way, it becomes possible not only to use less material than if two independent apparatus are used, but an advantage is also obtained with respect to economy in operation. If, for instance, it is desired to produce homogenized cream, whole milk is fed into the separator, and the cream, which is separated out, is passed into the built-in homogenizing arrangement so that the desired final product is obtained in only one working operation. On the other hand, if it is desired to produce homogenized whole milk, it is only necessary to remix the cream, homogenized in this way, with the skim milk. If especially high demands are made on the stability of the homogenized product, the homogenized cream can be returned to the centrifugal separator, and there mixed with the in-flowing milk. Depending upon the efficiency of the separator, all fat globules over a given size are separated from the mixture fed into the separator, irrespective of whether they belong to the original whole milk which enters the bowl for the first time, or to the recycled cream which has not yet been sufficiently homogenized. This makes it possible in a simple way, by regulating the clean skimming of the separator, to obtain a final product which satisfies certain demands on quality, without having to make any changes of the more sensitive homogenizing arrangement, which is much more difficult to regulate.

In addition to providing these operating advantages which make it possible even for a smaller dairy with little equipment to make final products of different qualities, such a combination avoids a special pressure source for the homogenization. As is well-known, it is these sources of pressure for the homogenizing machines which in practice, cause the greatest difficulties. At high demands on the homogenized product, even the best homogenizing arrangements require pressures in the order of 100–300 kgs. (1400–4200 lbs. per square inch). Therefore, from a practical viewpoint, only piston pumps can be used. In such pumps the inlet and outlet valves are comparatively hard to clean and to keep clean. Besides, these pumps are complicated in their design and expensive. If, in order to simplify the homogenizing arrangement, a pump of the centrifugal, gear or screw type is substituted for the piston pump as a pressure source, the resulting lower pressure (which usually does not amount to more than 140–210 lbs. per square inch) is not sufficient for making a well homogenized product. In the arrangement according to the invention, the pressure existing in the separator bowl (about 560–840 lbs. per square inch) is used at the same time for the homogenization so that a separate pump is not required. In those cases, which seldom occur, where a pressure of about 700 lbs. per square inch is insufficient for homogenizing, it is possible to use the separator for qualitative control after the homogenization, that is, for separating out all particles which are not sufficiently finely comminuted, which are then returned to the homogenizing apparatus. In this way a final produce may be obtained of practically any desired quality.

Homogenized milk, as is known, deposits rather a large quantity of sludge in passing through a centrifugal bowl. Accordingly, the disc set of the bowl is preferably divided into two sections, of which the lower section, for example, receives the liquid from the bowl inlet and is provided with a so-called concentrator disc set for clean skimming, while the other section is provided with a clarifier disc set for purification, the two sections being separated from each other by a spacing member which serves as a top disc for the clean skimming compartment and is constructed so that it assists in forcing the separated cream to the homogenization orifices. On the other hand, the spacing member also serves as a bottom disc or distributor for the upper clarifier disc set. The skim milk can freely pass at the bowl wall around the outer edge of this spacing member and enter from the outside into the upper disc set, and finally leave the separator through the normal discharge line. The separated sludge is deposited on the wall of the bowl.

The attached drawing shows, as an example, a vertical sectional view of one embodiment of the invention. It consists mainly of a separator bowl with a homogenizing device built into it. The high pressure, existing in the outer part of the bowl during operation, is employed for forcing the lighter component, separated in the separating chamber of the bowl, through the homogenizing device. This device therefore is arranged to discharge into a chamber situated outside the bowl in the frame of the centrifugal. Consequently, the lighter separated component is discharged from the bowl into this chamber.

The inlet line 21 of the centrifugal is connected in the usual manner by a flexible seal with the bowl spindle 22, which is hollow and forms an inlet channel to the bowl. The channel in the bowl spindle continues through the bottom part 23 of the bowl to a set of conical discs 24 in a lower section of the bowl chamber. The liquid entering this lower section is divided in the disc set into a heavier component and a lighter one. The lighter component moves inwards to a chamber 25, from which it passes through channels 26 and 27 to a homogenizing device 28 located at the outer bottom part 29 of the bowl. The channel 27 is preferably in the form of a slot or interspace between the bottom part 29 of the bowl and the bottom disc 30. The homogenizing device 28 has a discharge orifice 31 situated outside the bowl and opening into a stationary collection chamber 32 in the frame of the centrifugal. This chamber is connected by means of a channel 33 with the inlet line 21. The channel 33 opens into a constriction 34 in the line 21. Because of the increased velocity at the constriction 34, the pressure of the liquid there is correspondingly lower so that a pumping action arises in the direction from the chamber 32 towards the constriction 34. In this way, a lower pressure is obtained in the chamber 32. The neck of the centrifugal bowl is made tight against the frame of the centrifugal by means of a packing 35, which prevents the atmospheric air from entering the interior of the frame, and thus also the chamber 32. The latter may thus be considered a vacuum space.

The separated heavier component in the disc set 24 moves outwards to the sludge chamber 36 and thence upwards and inwards to a disc set 37, placed above the disc set 24 and separated from the latter by means of a cone-shaped part 38. In the disc set 37 the remaining heavier impurities are separated from the liquid. The purified liquid flows inwards to a chamber 39 in the central part of the bowl and is discharged from there through a central outlet 40 in the bowl and a stationary discharge line 41, the latter being tightly connected with outlet 40 through the seal or packing 35.

Assuming that the liquid to be treated is whole milk, the operation of the apparatus will now be described.

The whole milk is fed in through the inlet line 21 and the bowl spindle 22 to the lower disc set 24 of the bowl, where fat globules of normal size are separated out and, together with a certain part of the milk serum, pass as cream to the centrally located chamber 25, and from this to the homogenizing device 28, where the fat globules are divided up into considerably smaller units. In this way a homogenized cream is obtained which is thrown out into the chamber 32. This cream can be used as it is, in which case it is discharged from the chamber 32 through a separate outlet (not shown). Otherwise, it is returned for the production of homogenized whole milk through the channel 33 to the line 21, where it is mixed with the current of incoming whole milk. Fat globules above a certain size discharged from the device 28 are separated out again in the disc set 24, and return to the element 28 for further comminution. Those fat particles which are sufficiently small accompany the current of milk serum out to the chamber 36, and then through the disc set 37 to the discharge line 41. The force field in the disc set 24 prevents all fat particles above a certain size from accompanying the current of milk through the chamber 36 to the outlet 41. This insures an homogenized product with the intended fine comminution of the fat particles.

The homogenizing device 28 can be constructed in various ways. It can either have the plate or cone shape commonly used in high pressure homogenizing machines; or it may be so constructed that the liquid is forced through an orifice and given a high velocity as it enters a subsequent whirl-chamber, in which the velocity is changed as completely as possible into liquid friction, as disclosed in my Patent No. 2,634,109 dated April 7, 1953. In order still more to increase the efficiency of the latter arrangement, which is based upon homogenization at the highest possible turbulence with avoidance of friction against the walls surrounding the liquid, the liquid can be brought into rotation before it enters the orifice. The axis of rotation of the liquid whirl is then preferably parallel to the axis of rotation of the separator bowl, in order to avoid a turning of the direction of rotation. In order to increase the efficiency still more, the whirl chamber can be provided with insertions which act to increase the eddying and whirling effect, for instance, by means of sharp points and edges in the flow path. Through the formation of a great number of new whirls and eddies, the turbulence is increased.

The liquid component to be homogenized can be fed into a single homogenizing device in the bowl or the latter can be provided with several parallel connected homogenizing devices, with the advantage that the bowl has a better balance while running and consequently fewer stresses on the driving mechanism are caused. When the liquid flows out of the homogenizing device of the bowl and into the receiving chamber in the frame, and finally into the inlet line, it has an outflow velocity commensurate with its radial distance from the bowl axis and the rotation velocity of the bowl.

If it is important to have the power consumption for the separator low, or it is desired to effect further homogenization of the treated material, the current of liquid from the homogenizing device 28 is discharged obliquely backward, reckoned in the direction of the bowl rotation, or is directed at the sides or the bottom, of the collecting chamber 32, in order to transfer the velocity into turbulence; or the receiving chamber 32 is provided with separate concussion plates, against which the liquid strikes and which divide the receiving chamber into smaller whirl chambers. In order to obtain good keeping qualities of the emulsion product, formation of foam should be avoided. By suitable measures, this can be reduced or completely prevented. With liquids which have the property of occluding air, it is sufficient to make the separator frame completely closed, so that no new air can flow in during the run. In this way, after formation of foam during a short period at the start of an operation, a liquid completely free of foam will soon be obtained. If the liquid itself gives off air, the whole separator frame can be placed under vacuum.

The apparatus of the invention can also be employed for treatment of other dispersions. For instance, it can be used when refining vegetable oils with alkaline solutions, or mineral oil products with sulphuric acid or other inorganic reagents. In order to obtain a quick and complete reaction, and in order to keep the quantity of the reagents as low as possible, these must be mixed in a very finely comminuted state, and be separated out after a few seconds, if the mixture has been sufficiently effective. The new apparatus can also be employed to advantage for homogenization problems where high demands are made on the keeping qualities of the final product.

This application is a continuation-in-part of my copending application Ser. No. 92,774, filed May 12, 1949 (now Patent No. 2,595,376 of May 6, 1952).

I claim:

1. A method of treating milk and other dispersions, which comprises feeding the dispersion into a locus of centrifugal force and there separating it centrifugally into components, feeding one of the separated components to the outer peripheral portion of the locus and there homogenizing it under the centrifugally generated pressure of a liquid body extending continuously from said outer portion inward to the region of the rotation axis of the locus, and separately discharging the components, including the homogenized component, from the locus.

2. A method of treating milk and other dispersions, which comprises feeding the dispersion into a locus of centrifugal force and there separating it centrifugally into components, then, while one of the separated components is still in said locus, homogenizing said one component under the centrifugally generated pressure of a liquid body extending continuously from the outer peripheral portion of the locus to the region of the rotation axis thereof, separately discharging the components, including the homogenized component, from the locus, and returning the discharged homogenized component into the locus for further centrifugal separation.

3. A method according to claim 2, in which said discharged homogenized component is mixed with the dispersion being fed into the locus.

4. A method of treating milk and other dispersions, which comprises feeding the dispersion into a locus of centrifugal force and there separating it centrifugally into a light component having liquid particles and a heavy component having liquid particles smaller than said first particles, separately discharging the heavy component from the locus, homogenizing said first component while it is still in the locus and under the action of the centrifugal force in the locus, separately discharging the homogenized component from the locus, and returning the discharged homogenized component into the locus for further centrifugal separation into components of larger and smaller liquid particles, respectively.

5. A method according to claim 4, in which said heavy component, after its separation but before it is discharged from the locus, is subjected to a centrifugal purification treatment at a region remote from said separation of the components.

6. Apparatus for treating milk and other dispersions, which comprises a rotatable centrifugal bowl having an inlet for the dispersion and a separating chamber communicating with the inlet, the bowl also having an outlet for one of the components separated in the chamber, an homogenizing device rotatable with and in the bowl at the peripheral part thereof and forming an outlet for the other separated component, the homogenizing device communicating with the separating chamber to receive said last component and operable under the centrifugal force acting upon said last component, a stationary frame surrounding the bowl and providing a collection chamber for receiving the discharge from the homogenizing device, and a return channel extending from the collection chamber for refeeding at least part of the discharge from the homogenizing device to the centrifugal bowl.

7. Apparatus according to claim 6, in which said return channel includes an inlet line leading to the bowl inlet and having a constricted portion at which the flow of the dispersion is at high velocity and low pressure, and a channel connecting said collection chamber with said constricted portion.

8. Apparatus for treating milk and other dispersions, which comprises a rotatable centrifugal bowl having an inlet for the dispersion and a separating chamber communicating with the inlet, the bowl also having an outlet for one of the components separated in the chamber, an homogenizing device rotatable with and in the bowl at the peripheral part thereof and forming an outlet for the other separated component, the homogenizing device communicating with the separating chamber to receive said last component and operable under the centrifugal force acting upon said last component, a stationary frame surrounding the bowl and providing a collection chamber for receiving the discharge from the homogenizing device, and interengaging parts in the bowl defining between them a channel communicating at its inner end with the central part of the separating chamber and leading through the rotation axis of the bowl to the homogenizing device, one of said interengaging parts also defining said inlet.

9. Apparatus for treating milk and other dispersions, which comprises a rotatable centrifugal bowl having an inlet for the dispersion and a separating chamber communicating with the inlet, the bowl also having an outlet for one of the components separated in the chamber, an homogenizing device rotatable with and in the bowl at the peripheral part thereof and forming an outlet for the other separated component, the homogenizing device communicating with the separating chamber to receive said last component and operable under the centrifugal force acting upon said last component, a stationary frame surrounding the bowl and providing a collection chamber for receiving the discharge from the homogenizing device, the homogenizing device being located in the bowl bottom, and a disc in the bowl overlying said bottom and forming therewith a channel communicating at its inner end with the central part of the separating chamber and at its outer end with the homogenizing device.

10. Apparatus according to claim 9, in which said bottom also provides said inlet.

11. Apparatus for treating milk and other dispersions, which comprises a rotatable centrifugal bowl having an inlet for the dispersion and a separating chamber communicating with the inlet, the bowl also having an outlet for one of the components separated in the chamber, an homogenizing device rotatable with and in the bowl at the peripheral part thereof and forming an outlet for the other separated component, the homogenizing device communicating with the separating chamber to receive said last component and operable under the centrifugal force acting upon said last component, a stationary frame surrounding the bowl and providing a collection chamber for receiving the discharge from the homogenizing device, and an imperforate partition dividing the interior of said separating chamber into two superimposed sections, one section receiving the dispersion feed and separating said components, and the other receiving said first component from the first section and centrifugally purifying the same before it is discharged through said first outlet, the homogenizing device communicating with the central portion of said first section through a channel in the bowl by-passing said second section.

12. Apparatus according to claim 11, in which said sections are in communication with each other around the outer edge of the partition near the periphery of the chamber.

13. Apparatus for treating milk and other dispersions, which comprises a rotatable centrifugal bowl having an inlet for the dispersion and a separating chamber communicating with the inlet, the bowl also having an outlet for the heavier component separated in the chamber, an homogenizing device rotatable with and in the bowl at the peripheral part thereof and forming an outlet for the lighter separated component, the bowl having a passage leading from the axial portion thereof by which the homogenizing device communicates with the separating chamber to receive said last component, the homogenizing device being operable under the centrifugal force acting upon said last component in said passage, a stationary frame surrounding the bowl and providing a collection chamber for receiving the discharge from the homogenizing device, a stationary discharge pipe for said heavier component, and a seal forming an air-tight connection between the stationary pipe and said bowl outlet for the heavier component.

14. Apparatus according to claim 13, comprising also means for creating a vacuum in said collection chamber.

References Cited in the file of this patent

UNITED STATES PATENTS

| Number | Name | Date |
|---|---|---|
| 447,530 | Wahlin | Mar. 3, 1891 |
| 450,391 | Wahlin | Apr. 14, 1891 |
| 491,501 | Wahlin | Feb. 7, 1893 |
| 497,416 | Sharples | May 16, 1893 |
| 519,691 | Andersson | May 15, 1894 |
| 542,756 | Ekenberg | July 16, 1895 |
| 900,446 | Stussy | Oct. 6, 1908 |
| 1,242,560 | Kingsbury | Oct. 9, 1917 |
| 2,087,630 | Schelbeck | July 20, 1937 |
| 2,089,043 | Svensjo | Aug. 3, 1937 |
| 2,167,881 | Eberts et al. | Aug. 1, 1939 |
| 2,186,033 | Milton | Jan. 9, 1940 |
| 2,380,856 | McFadden | July 31, 1945 |
| 2,453,924 | McFadden | Nov. 16, 1948 |
| 2,595,376 | Zachariassen | May 6, 1952 |